(12) United States Patent
Brunone

(10) Patent No.: US 7,530,450 B2
(45) Date of Patent: May 12, 2009

(54) STATION FOR SUPPORTING A CONVEYOR BELT, AND A CONVEYOR INCLUDING IT

(76) Inventor: René Brunone, 46, rue du General Leclerc, Saint-Marcel (FR) 27950

( * ) Notice: Subject to any disclaimer, the term of this patent is extended or adjusted under 35 U.S.C. 154(b) by 0 days.

(21) Appl. No.: 11/785,977

(22) Filed: Apr. 23, 2007

(65) Prior Publication Data

US 2007/0246330 A1    Oct. 25, 2007

(30) Foreign Application Priority Data

Apr. 21, 2006    (FR) ................................. 06 03579

(51) Int. Cl.
B65G 21/00    (2006.01)
B65G 21/08    (2006.01)
B65G 15/08    (2006.01)

(52) U.S. Cl. .................. 198/825; 198/828; 198/830; 198/841

(58) Field of Classification Search ......... 198/824–830, 198/841, 497–499
See application file for complete search history.

(56) References Cited

U.S. PATENT DOCUMENTS

| | | | | |
|---|---|---|---|---|
| 3,217,862 A | | 11/1965 | Herrmann | |
| 3,360,105 A | * | 12/1967 | Pelzer | 198/825 |
| 5,103,967 A | * | 4/1992 | Stoll | 198/823 |
| 5,799,780 A | * | 9/1998 | Steeb et al. | 198/823 |
| 5,826,703 A | * | 10/1998 | Altemus et al. | 198/823 |
| 7,325,673 B2 | * | 2/2008 | Kotaki et al. | 198/823 |

FOREIGN PATENT DOCUMENTS

| | | |
|---|---|---|
| DE | 59 725 | 1/1968 |
| DE | 39 40 786 | 5/1991 |
| DE | 91 03 825.1 | 5/1991 |
| EP | 0 416 201 | 3/1991 |

* cited by examiner

*Primary Examiner*—Mark A Deuble
(74) *Attorney, Agent, or Firm*—Young & Thompson

(57) ABSTRACT

A station for supporting a moving conveyor belt (3) includes a cradle (17) for guiding the belt (3), the cradle (17) having at least two rollers (33) for guiding and supporting the belt (3), a frame (15) for supporting the rollers (33), and anti-jamming protection (35) disposed along the rollers (33) and secured to the frame (15). Protection (35) includes a protective bar (36) extending continuously along the length of at least two rollers (33), being substantially parallel to a generator line of each roller (33).

15 Claims, 5 Drawing Sheets

STATION FOR SUPPORTING A CONVEYOR BELT, AND A CONVEYOR INCLUDING IT

BACKGROUND OF THE INVENTION

1. Field of the Invention

The present invention relates to a station for supporting a conveyor having a movable belt, the station being of the type comprising:

a cradle for guiding the belt, the cradle comprising at least two rollers for guiding and supporting the belt;

a frame for supporting the rollers; and anti-jamming protection disposed along the rollers and secured to the frame.

2. Field of the Invention

In order to handle bulk materials, it is known to use conveyors belts, also known as conveyors. Such a conveyor essentially comprises a belt forming a loop and supported by support stations. The belt is held at its end by two reversing rollers. One of the rollers is motor-driven in order to drive the belt.

Such a support station is generally constituted by a frame together with a belt support cradle. The cradle generally comprises rollers or sliding skids.

With rollers, they rotate as the belt advances and thus presents a risk for an operator on the side of each station that is upstream relative to the advance direction of the belt. The movement of the rollers can entrain a garment and jam it in the angle between the roller and the belt. This angle is commonly referred to as the "reentrant" angle. An operator can also inadvertently have a hand trapped in the reentrant angle while performing a maintenance operation.

Anti-jamming protection devices exist for conveyor stations. Each type of conveyor requires a special type of protection device, some of which are relatively expensive.

SUMMARY OF THE INVENTION

An object of the invention is to provide a protection device that is simple and of moderate expense.

To this end, the invention provides a station of the above-specified type characterized in that the protection comprises a protective bar extending continuously along the length of at least two rollers extending substantially parallel to a generator line of each roller.

According to other characteristics of the invention:

the bar is bent and matches the curvature of the guide cradle;

the bar comprises an elongate core and a sheath surrounding the elongate core;

the bar presents a cross-section having a side facing towards the belt and a first circularly-arcuate concave side adjacent thereto having substantially the same diameter as the rollers, with the circularly-arcuate side being situated facing each of the rollers;

the cross-section of the bar includes a second circularly-arcuate side, adjacent to the side facing towards the belt;

the rollers and the bar are spaced apart by non-zero spacing; and the protection includes fastener means for fastening to the frame, the fastener means comprising two end plates together with fastener screws, the bar having an end face at each of its ends, the end plates being secured to the bar via each of the end faces of the bar by the fastener screws, and also being fastened to each of the sides of the frame.

The invention also provides a conveyor, characterized in that it comprises a set of support stations as described above with a transport belt suitable for traveling over the stations, the belt and the bar at each station being spaced apart by non-zero spacing.

BRIEF DESCRIPTION OF THE DRAWING FIGURES

The invention can be better understood on reading the following description given purely by way of example and made with reference to the accompanying drawings, in which.

DETAILED DESCRIPTION OF THE INVENTION

Figure 1:
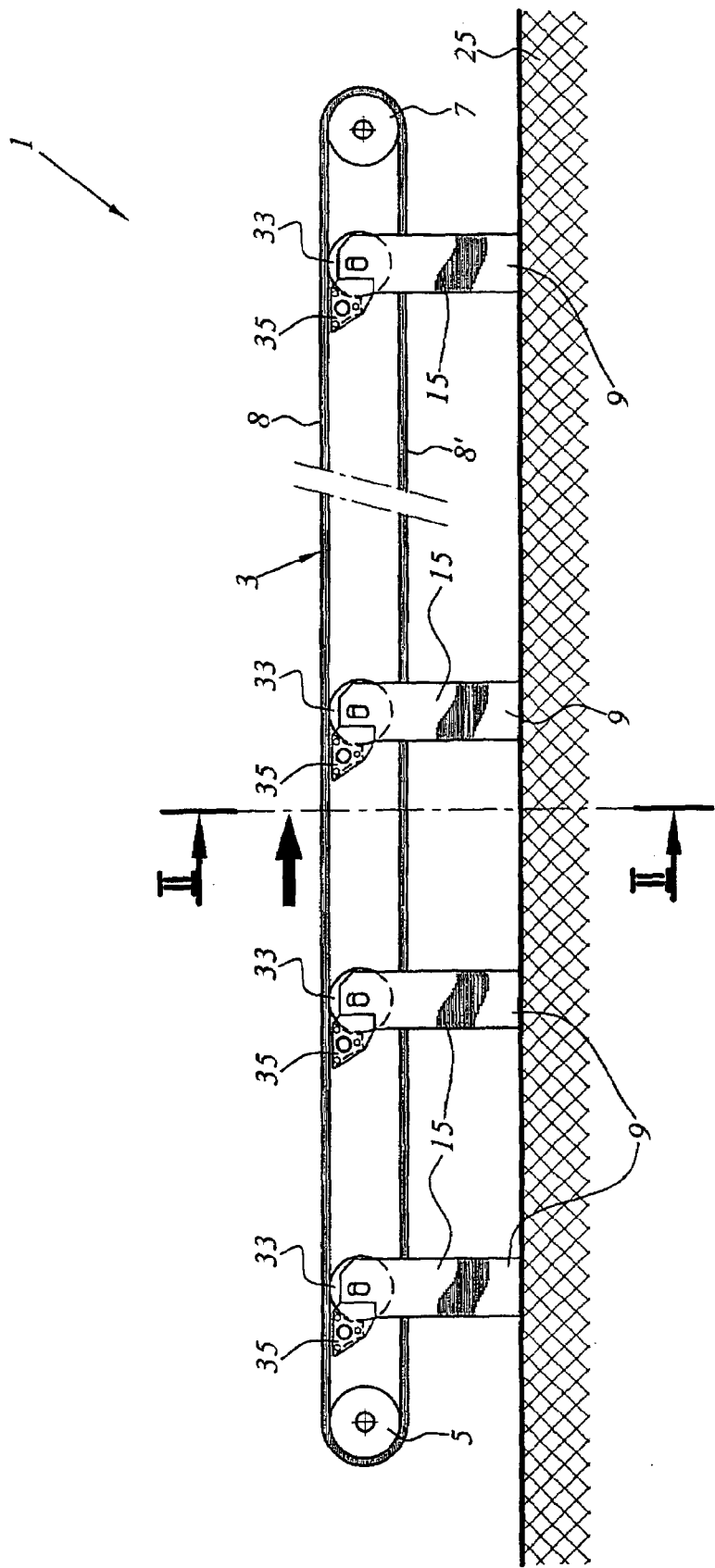
FIG. 1 is a diagrammatic side view of a conveyor belt supported by roller stations.

The conveyor 1 shown in FIG. 1 is intended, for example, for transporting minerals taken from a quarry. It comprises a conveyor belt 3 forming a loop and engaged at its ends around two reversing rollers 5 and 7. Of those two rollers, one roller 5 is motor driven for driving the belt 3, thereby defining the upstream end of the belt 3. The loop is thus made up of a top segment 8 for transporting minerals, and a return bottom segment 8'.

Along the length of the top segment 8, the belt 3 is supported by a plurality of stations 9 that serve to support and guide the belt 3. The stations 9 are all identical.

Figure 2:
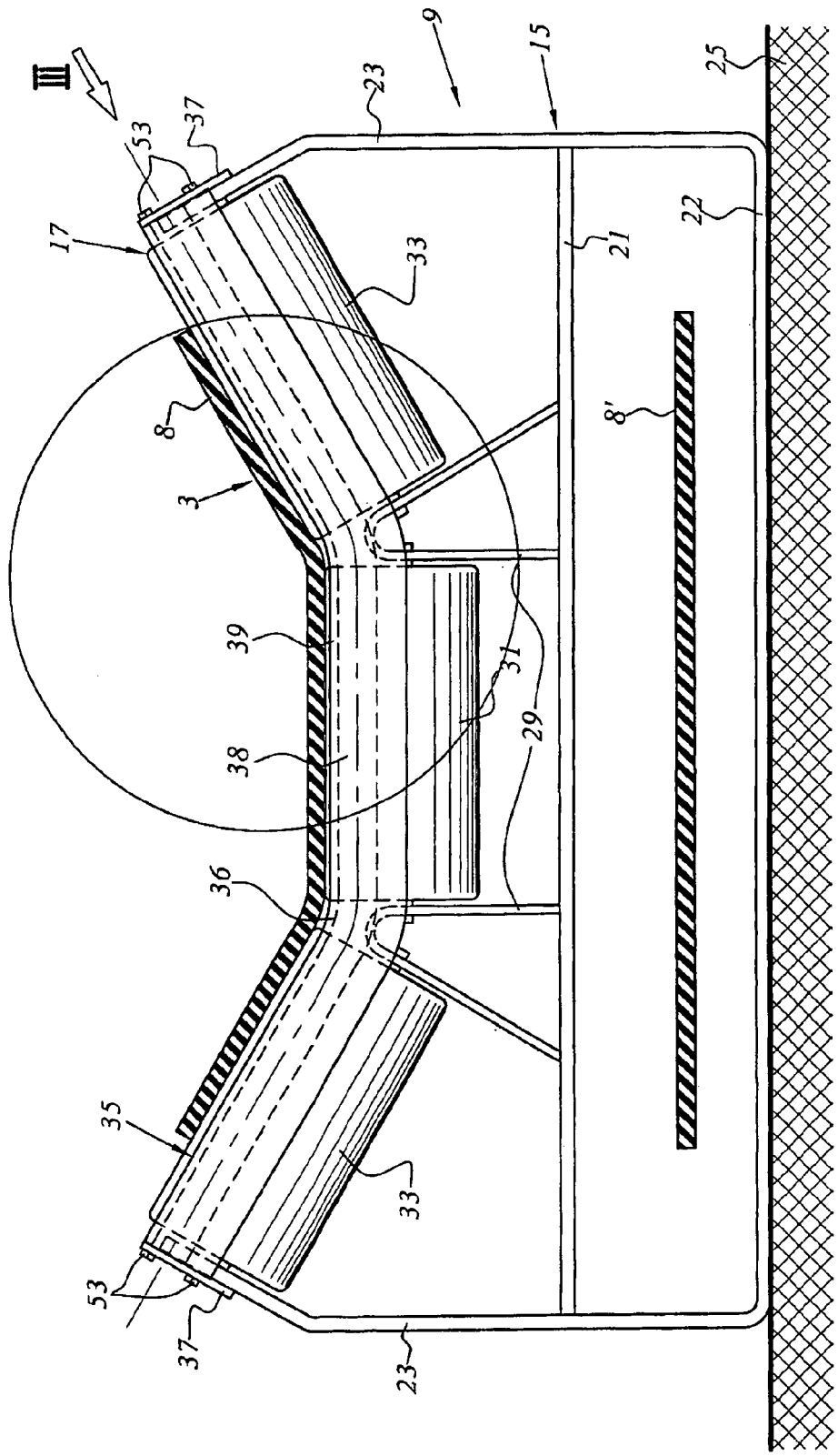
FIG. 2 is an end view of a station in section on plane II-II of FIG. 2.

As shown in FIG. 2, each station 9 comprises a metal carrier frame 15 and a cradle 17 for supporting and guiding the belt 3. The frame 15 essentially comprises top and bottom transverse beams 21 and 22, and two legs 23 standing on the ground 25 on either side of the belt 3. The transverse beams 21 and 22 interconnect the two legs 23. The frame 15 is placed directly on the ground 25 via the bottom beam 22.

The top and bottom beams 21 and 22 are vertically spaced apart with the bottom segment 8' of the belt 3 passing between the two beams.

The frame 15 has two roller-support lugs 29. The lugs 29 are constituted by metal blades having their ends secured to the top transverse beam 21 of the frame 15. Each lug 29 forms a right-angled triangle. A horizontal bottom center roller 31 and two sloping side rollers 33 are mounted to move in rotation between the support lugs 29 and the legs 23 of the frame 15. These rollers 31 and 33 extend in a common vertical plane and are suitable for receiving the belt 3 and for deforming it to take up a trough shape.

Figure 3:
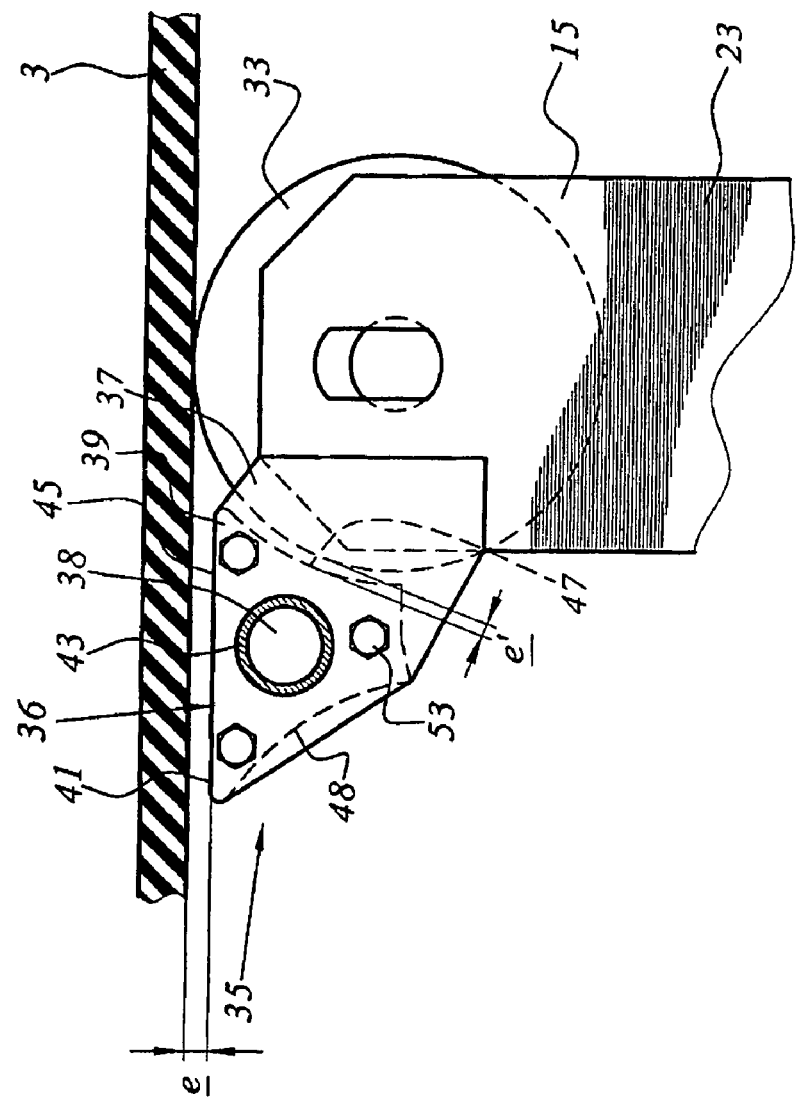
FIG. 3 is a corresponding side view seen looking along arrow III of FIG. 2.

On the upstream side of the support station 9, an anti-jamming protection 35 (visible in FIG. 3) masks the so-called "reentrant" angle formed by the belt 3 and the two support rollers 31 and 33. The protection 35 essentially comprises a bar 36 and fastener plates 37. The bar 36 comprises a tubular metal core 38 and a sheath 39 sheathing the core 38. By way of example, the sheath 39 is made of polyethylene. The section 41 of the sheath 39 is pierced by an orifice 43 for receiving the tubular core 38. The section 41 of the sheath 39 has a straight side 45 and a side 47 adjacent to the side 45 that is circularly arcuate, having the same diameter as the rollers 31 and 33. These two sides 45 and 47 form an angle that matches the angle formed between the belt 3 and the rollers 31 and 33.

The section 41 of the sheath 39 has a second circularly-arcuate side 48 of diameter greater than the diameter of the side 47, and suitable for protecting a roller. The side 48 is likewise adjacent to the straight side 45.

The protection 35 is secured to the frame 15 of the station 9 on either side of the belt 3 by the fastener plates 37 that are of greater diameter.

The fastener plates 37 are secured by fastener screws 53 to the two end faces of the bar 36, and they are also fastened to the frame 15, e.g. by welding.

The bar 36 that extends continuously from one end of the cradle 17 to the other while being held solely at its ends.

The protection 35 is situated beneath the belt 3 facing the rollers 31 and 33 and spaced apart a little from the belt 3 and the rollers 31 and 33. The space e formed between the protection 35 and the belt 3 advantageously lies in the range 0 to 10 millimeters (mm), being about 5 mm, for example. The space e', formed between the protection 35 and the rollers 31 and 33 is substantially equal to e.

As shown in FIG. 2, the protection 35 masks the angle between the rollers 31 and 33 and the belt 3 over the entire length of the cradle 17, via its sides 45 and 47, and following the curvature of the cradle 17 in the width direction of the belt 3.

The sheath 39 and the tubular core 38 are thus folded together essentially in two zones that correspond to the angles formed by the axes of each of the side rollers 33 relative to the axis of the central roller 31.

A station 9 of a conveyor 1 with such protection 35 is made very easily by having the bar 36 that is easy to fabricate and to mount.

The sheath 39 is fabricated by the following method: extruding a plastics material, e.g. polyethylene, through a die. After being cut to length, a continuous part is obtained that is of constant section. The section, defined by the shape of the die, presents a straight side 45 and two circularly-arcuate sides 47 and 48 of different diameters and each adjacent to the straight side 45. A circular hole in the section of the sheath is provided for forming a continuous tubular orifice 43 in the bar 36 while it is being extruded.

Thereafter, a metal tube of diameter matching that of the hole is inserted into the orifice 43, with the tube forming the core 38 of the bar 36.

The bar 36 as formed in this way is then bent to match the shape of the cradle 17 of the conveyor 1, and is finally secured at its ends to the frame 15 of a station 9.

The relative deformability of the core 38 and of the sheath 39 makes it possible to use a single original bar 36 for fabricating a protective device 35 on conveyors 1 of different curvatures.

Preferably, the section of the bar 39 presents two circularly-arcuate sides 45 and 48 having different diameters that correspond to two different diameters of standard rollers 31, 33, thus enabling the bar to be matched to different types of conveyor 1.

Figure 4:
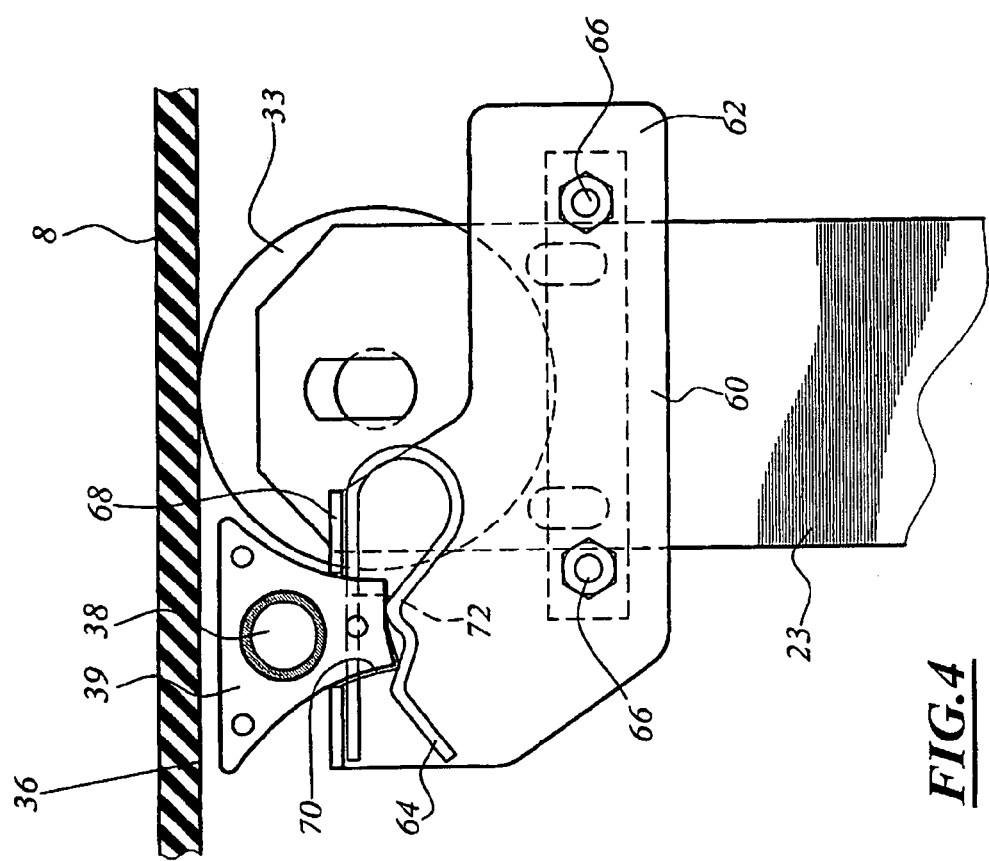
FIG. 4 is a side view similar to FIG. 3, showing a variant embodiment of the means to secure the anti-jamming protection to the frame.
Figure 5:
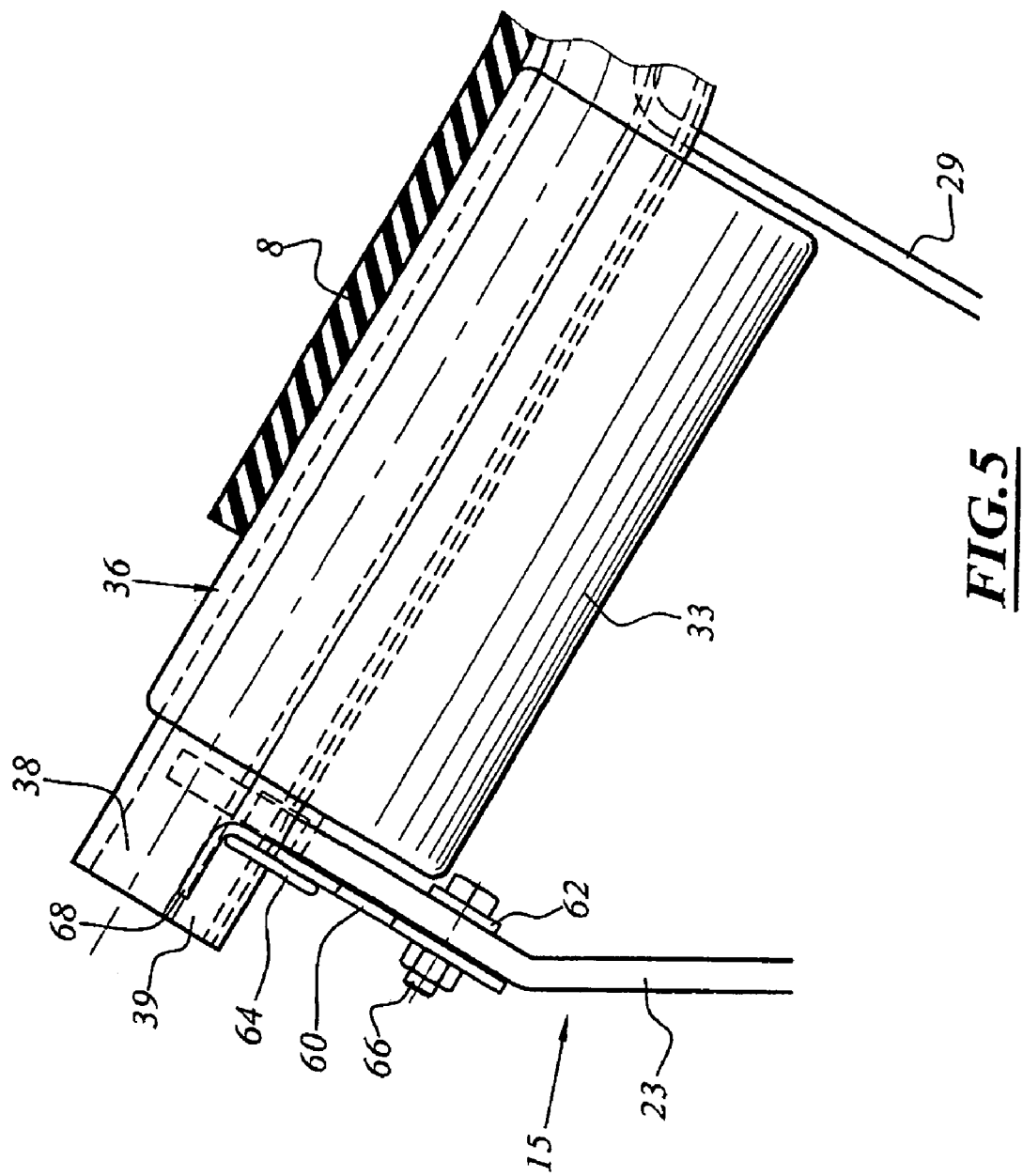
FIG. 5 is a front view corresponding to FIG. 4.

In a variant embodiment shown in FIGS. 4 and 5, the fastener plate 37 at each end of the bar 26 and the fastener screws 53 are replaced by a folded metal sheet 60, a backing sheet 62, and a pin 64.

The folded sheets 60 are pressed against the outside faces of the legs 23.

The backing plates 62 are placed against the inside faces of the legs 23 and are securely fastened to the folded sheets 60 by bolts 66 such that the legs 23 are sandwiched between the sheets 60 and the backing plates 62.

Each of the sheets 60 has a top edge 68 folded outwards, with a notch 70 being cut therein of a shape that matches that of the bar 36.

The bar 36 is received and supported at its two ends in the notches 70 of the folded sheets. It is held at its ends in the notches by the U-shaped pins 64 engaged in through holes 72 formed in the bar 36 and slidably engaged under the folded edges 68.

The invention claimed is:

1. A conveyor (1), comprising:
a set of support stations (9); and
a transport belt (3) suitable for traveling over the stations (9), each station comprising:
a cradle (17) for guiding the belt (3), the cradle (17) comprising at least two rollers (31, 33) for guiding and supporting the belt (3);
a frame (15) for supporting the rollers (31, 33); and
anti-jamming protection (35) disposed along the rollers (31, 33) and secured to the frame (15);
wherein the protection (35) comprises a protective bar (36) extending continuously along a length of at least two rollers (31, 33) extending substantially parallel to a generator line of each roller (31, 33), wherein the bar (36) is bent and matches a curvature of the guide cradle (17), the bar (36) comprising an elongate core (38) and a sheath (39) surrounding the elongate core (38), the belt and the bar (36) at each station being spaced apart by non-zero spacing (e), and the rollers (31, 33) and the bar (36) are spaced apart by a spacing (e') which is non-zero and is less than 10 millimeters.

2. The conveyer according to claim 1, wherein the bar (36) presents a crosssection (41) having a side (45) facing towards the belt (3) and a first circularly-arcuate concave side (47) adjacent thereto having substantially a same diameter as the rollers (31, 33), with the circularly-arcuate side (47) being situated facing each of the rollers (31, 33).

3. The conveyer according to claim 2, wherein the cross-section (41) of the bar (36) includes a second circularly-arcuate side (48), adjacent to the side (45) facing towards the belt (3).

4. The conveyer according to claim 1, wherein the protection (35) includes fastener means for fastening to the frame (15), the fastener means comprising two end plates (37) together with fastener screws (53), the bar (36) having an end face at each of its ends, the end plates (37) being secured to the bar (36) via each of the end faces of the bar (36) by the fastener screws (53), and also being fastened to each of the sides of the frame (15).

5. The conveyer according to claim 1, wherein the sheath is made of polyethylene.

6. A conveyor (1), comprising:
a set of support stations (9); and
a transport belt (3) suitable for traveling over the stations (9), each station comprising:
a cradle (17) for guiding the belt (3), the cradle (17) comprising at least two rollers (31, 33) for guiding and supporting the belt (3);
a frame (15) for supporting the rollers (31, 33); and
anti-jamming protection (35) disposed along the rollers (31, 33) and secured to the frame (15);
wherein the protection (35) comprises a protective bar (36) extending continuously along a length of at least two rollers (31, 33) extending substantially parallel to a generator line of each roller (31, 33), wherein the bar (36) is bent and matches a curvature of the guide cradle (17), the bar (36) comprising an elongate core (38) and a sheath (39) surrounding the elongate core (38), the belt and the bar (36) at each station being spaced apart by nonzero spacing (e), and the protection masks a "reentrant" angle formed by the rollers and the belt.

7. The conveyer according to claim 6, wherein the bar (36) presents a cross-section (41) having a side (45) facing towards the belt (3) and a first circularly-arcuate concave side (47) adjacent thereto having substantially a same diameter as the rollers (31, 33), with the circularly-arcuate side (47) being situated facing each of the rollers (31, 33).

8. The conveyer according to claim 7, wherein the cross-section (41) of the bar (36) includes a second circularly-arcuate side (48), adjacent to the side (45) facing towards the belt (3).

9. The conveyer according to claim 6, wherein the protection (35) includes fastener means for fastening to the frame (15), the fastener means comprising two end plates (37) together with fastener screws (53), the bar (36) having an end face at each of its ends, the end plates (37) being secured to the bar (36) via each of the end faces of the bar (36) by the fastener screws (53), and also being fastened to each of the sides of the frame (15).

10. The conveyer according to claim 6, wherein the sheath is made of polyethylene.

11. A conveyor (1), comprising:
   a set of support stations (9); and
   a transport belt (3) suitable for traveling over the stations (9), each station comprising:
   a cradle (17) for guiding the belt (3), the cradle (17) comprising at least two rollers (31, 33) for guiding and supporting the belt (3);
   a frame (15) for supporting the rollers (31, 33); and
   anti-jamming protection (35) disposed along the rollers (31, 33) and secured to the frame (15);
   wherein the protection (35) comprises a protective bar (36) extending continuously along a length of at least two rollers (31, 33) extending substantially parallel to a generator line of each roller (31, 33), wherein the bar (36) is bent and matches a curvature of the guide cradle (17), the bar (36) comprising an elongate core (38) and a sheath (39) surrounding the elongate core (38), the belt and the bar (36) at each station being spaced apart by nonzero spacing (e), and the protection has two sides that are adjacent to each other, said two sides forming between them an angle that matches an angle formed between the belt and the rollers.

12. The conveyer according to claim 11, wherein the bar (36) presents a crosssection (41) having a side (45) facing towards the belt (3) and a first circularly-arcuate concave side (47) adjacent thereto having substantially a same diameter as the rollers (31, 33), with the circularly-arcuate side (47) being situated facing each of the rollers (31, 33).

13. The conveyer according to claim 12, wherein the cross-section (41) of the bar (36) includes a second circularly-arcuate side (48), adjacent to the side (45) facing towards the belt (3).

14. The conveyer according to claim 11, wherein the protection (35) includes fastener means for fastening to the frame (15), the fastener means comprising two end plates (37) together with fastener screws (53), the bar (36) having an end face at each of its ends, the end plates (37) being secured to the bar (36) via each of the end faces of the bar (36) by the fastener screws (53), and also being fastened to each of the sides of the frame (15).

15. The conveyer according to claim 11, wherein the sheath is made of polyethylene.

\* \* \* \* \*